United States Patent [19]
Adams

[11] Patent Number: 5,448,417
[45] Date of Patent: Sep. 5, 1995

[54] LASER PULSE SYNTHESIZER

[76] Inventor: Jeff C. Adams, 14311 166th Pl. SE., Renton, Wash. 98059

[21] Appl. No.: 33,282

[22] Filed: Mar. 16, 1993

[51] Int. Cl.[6] ............................................. G02B 5/08
[52] U.S. Cl. ................................... 359/856; 359/850; 359/857; 359/618; 359/140; 250/227.12; 372/25; 372/700
[58] Field of Search ................... 372/25, 24, 109, 700, 372/705; 385/4, 24; 359/636, 850, 855, 856, 857, 216, 217, 218, 219, 618, 851, 140; 250/227.12

[56] References Cited

U.S. PATENT DOCUMENTS

| | | | |
|---|---|---|---|
| 1,193,999 | 8/1916 | Dixon | 359/581 |
| 3,506,834 | 4/1970 | Buchsbaum et al. | 359/138 |
| 3,849,604 | 11/1974 | Benes et al. | 359/140 |
| 3,879,109 | 4/1975 | Thomas | 359/629 |
| 3,892,468 | 7/1975 | Duguay | 385/4 |
| 3,947,816 | 3/1976 | Rabedeau | 359/218 |
| 4,059,759 | 11/1977 | Harney | 250/206 |
| 4,283,116 | 8/1981 | Weis | 359/204 |
| 4,288,691 | 9/1981 | Horton | 250/281 |
| 4,344,671 | 8/1982 | Lang | 359/618 |
| 4,498,051 | 2/1985 | Hunter et al. | 359/618 |
| 5,309,456 | 5/1994 | Horton | 372/25 |
| 5,315,604 | 5/1994 | Chiu et al. | 372/25 |
| 5,329,118 | 7/1994 | Riza | 250/227.12 |
| 5,337,333 | 8/1994 | Daly et al. | 372/700 |
| 5,339,186 | 8/1994 | Weverka | 250/227.12 |
| 5,340,982 | 8/1994 | Nakazawa | 359/218 |

FOREIGN PATENT DOCUMENTS 2178262  2/1987  United Kingdom ................. 359/140

OTHER PUBLICATIONS

Vogel, et al., "Picosecond Optical Sampling" IEEE Journal of Quantum Electronics, vol. QE-10, No. 9, pp. 642-646, Sep. 1974.
IBM Technical Disclosure Bulletin: "Time Multiplexing System" M. R. Kagan, vol. 13., No. 9, Feb. 1971.
Weiner et al., "High Resolution Femtosecond Pulse Shaping", J. Opt. Soc. Am, Aug. 1988, p. 1563.
Reitze et al., "Shaping of Wide Bandwidth 20 Femtosecond Opt. Pulses", Appl. Phys. Let. Sep. 1992, p. 1260.
C.L.M Ireland, "Some Design Considerations and Application of a Fast Crystal Deflector", Proc. of the Forth National Quantum Electronics Conference 1979, p. 87.
T. Kobayashi et al., "Generation of Arbitrarily Shaped Optical Pulses in the Sub-Nanosecond to Picosecond Region using a Fast Electrooptic Deflector," IEEE J. Quantum Electronics, Feb. 1980 p. 132.

Primary Examiner—Loha Ben
Assistant Examiner—John Juba, Jr.

[57] ABSTRACT

A system that modifies a pulsed or continuous wave light beam of arbitrary frequency bandwidth facilitating optical pulse synthesis and pulse compression while largely conserving light energy. An electro-optic deflector scans a light pulse through an optical system which provides a varying optical path length that is a function of deflection angle. The input light pulse is temporally segmented in incremental or differential portions, each of which has a different transit time to some image plane at the output. The temporal portions are then recombined at the output to produce a new optical signal.

12 Claims, 9 Drawing Sheets

LASER PULSE SYNTHESIZER

FIELD OF THE INVENTION

The present invention relates to temporal laser pulse shaping, including the compression of laser pulses in time with a resulting increase in peak pulse power.

BACKGROUND OF THE INVENTION

In applications using pulsed laser beams it is often advantageous to have some measure of control on the temporal shape of the pulse. The resultant pulse may be temporally compressed, expanded, or structurally synthesized to activate some physical process that would have otherwise been difficult or impossible. An example application is the selective photoexcitation of the particles of plural isotope types which need to be separated. A discussion of this is found in U.S. Pat. No. 4,288,691 to J. A. Horton (issued Sep. 8. 1981) and U.S. Pat. No. 4,283,116 to J. A Weis (issued Aug. 11, 1981). Other application areas include laser material processing high energy physics, coherent spectroscopy, and optical signal processing.

A widely used and researched facet of laser pulse shaping involves the modification of a laser pulse using spectral filtering. Such filtering is obtained with prisms and/or gratings in optical systems which generally separate the constituent wavelength components of a laser pulse and modify them such that the optically recombined and modified wavelength components produces a pulse with a generally different shape than it had originally. Laser pulses that are narrow in time to begin with have wide bandwidths which allow the use of spectrally dispersive optical elements for pulse shaping. However, the utility of this method is diminished for spectrally narrow laser pulses as discussed by Weiner et al. in "High-resolution femtosecond pulse shaping," J. Opt. Soc. Am. B., Vol. 5, August, 1988, p. 1563, and Reitze et al., "Shaping of wide bandwidth 20 femtosecond optical pulses," Appl. Phys. Lett., Vol. 61, Sept., 1992, p. 1260. Optical energy losses are another disadvantage of spectrally dispersive optical systems used for active pulse shaping.

The difficulty of the above method for shaping laser pulses that are not originally narrow in frequency has precipitated other ways of producing shaped laser pulses. A general method splits a single laser pulse into a sequence of time-delayed pulses and recombines them in some way to form a pulse envelope of desired shape, usually longer than the original pulse. One simple method uses a passive pulse stacking scheme disclosed in U.S. Pat. No. 3,879,109 to C. F. Thomas (issued Apr. 22, 1975). No active mechanism is required and the system uses two sets of partially transmissive parallel mirrors spaced apart and with differing reflectivities, to obtain an exponential envelope. Any change in system parameters usually requires replacement of one or more mirrors and realignment of all. This method does allow for pulse compression.

U.S. Pat. No. 4,059,759 to R. C. Harney (issued Nov. 22, 1977) uses a magneto-optical (Faraday) polarization rotator in an optical system to generate a composite pulse or sequence of pulses with a pulse envelope of controllable temporal variation. One embodiment of this patent uses the Faraday rotator to switch during the passage of an optical pulse in order to segment the pulse into two portions for eventual recombining. However, there is not an allowance for multiple segmentation which limits the temporal resolution of the modified laser pulse. The system is limited by the relatively slow electrical activation of the Faraday cell since it requires large magnetic fields (hundreds of kGauss) supplied by inductive coils.

U.S. Pat. No. 4,288,691 to J. A. Horton (issued Sep. 8, 1981) discloses the use of a system of Pockel cells and polarizing beam splitters to temporally segment a laser pulse into two or more sections. The sections are then superimposed after a delay to create some desired shape. This scheme can produce pulse compression by a factor of approximately two for one Pockel cell. In order to segment a laser pulse into greater than two sections, a matrix of Pockel cells and polarizers are necessary. Also, the temporal narrowness of the segmentation depends on the limited speed of the Pockel cells which in turn limits the feature resolution of the synthesized pulse shape.

Another method to produce arbitrarily shaped laser pulses uses electro-optic beam deflection across an aperture or spatial filter. Such a scheme was reported by C. L. M. Ireland in the paper "Some design considerations and application of a fast crystal deflector," Proc. of the Fourth National Quantum Electronics Conference, 1979, p. 87. Here an experiment is described where a laser beam is rapidly scanned across a slit using electro-optic beam deflection to produce a laser pulse on the output of the slit with a temporal width equal to the slit width divided by the linear scan velocity. Similar arrangements using electro-optic beam deflection with apertures is reported by T. Kobayashi et al. in "Generation of arbitrarily shaped optical pulses in the subnanosecond to picosecond region using a fast electro-optic deflector," IEEE J. Quantum Electronics, Vol. QE-16, Feb., 1980, p. 132. In this paper one variation beyond the system demonstrated by C. L. M. Ireland uses an amplitude spatial filter in place of a slit which simply gives a transmission coefficient to light that varies with spatial position. A patterned filter of varying opacity is scanned using an electro-optic deflector to amplitude modulate a continuous wave (CW) or pulsed laser beam. This scheme is limited practically since the amplitude modulation is being accomplished at the great expense of lost optical energy.

A second variation discussed in the same paper by T. Kobayashi et al. uses in place of the amplitude spatial filter what the authors refer to as a phase-responsive spatial filter. Examples given of phase-response spatial filters are a glass wedge, a simple lens, and a biprism or smoothed biprism. A glass wedge in front of the electro-optic beam deflector modifies the temporal position of an entire laser pulse, while the biprism creates two pulses, each half the amplitude of the original. A simple lens that is electro-optically scanned can temporally broaden the original pulse. The advantage of these phase-responsive spatial filters is that optical energy is largely conserved unlike the amplitude spatial filters. However, no configuration using these or other optical elements is proposed which can facilitate optical pulse compression. Furthermore, the parameters that allow feature control of the pulse shaping are few and no scheme is reported that allows flexible synthesis of arbitrarily shaped optical pulses while largely conserving the energy of the original pulse.

A third variation mentioned in the same paper by T. Kobayashi et al. uses an electro-optic beam deflector and diffraction grating which can facilitate pulse compression. A short laser pulse is first produced by electro-optically scanning across an amplitude spatial filter as discussed earlier. This pulse is then reflected off a diffraction grating which acts like a multiplexer in the optical frequency domain to recombine the constituent optical frequency components to produce a temporally compressed pulse. However, this scheme again uses the ability to spectrally filter which first requires generation of a short laser pulse. This generated pulse must be broad enough in bandwidth to give a suitable magnitude of angular dispersion from the grating and would not work for an arbitrary input laser pulse.

SUMMARY OF INVENTION

The object of the subject invention disclosed and claimed herein is to provide a means to modify the temporal shape of a laser pulse while largely conserving laser pulse energy. The method to accomplish this uses rapid angular deflection of the laser beam over the approximate duration of the pulse such that each incremental or differential step in angular position within the total scan angle corresponds to a different optical path length to some image plane for the laser beam. Thus, different temporal segments of the laser pulse get delayed in time with respect to each other and are recombined to form a new temporal pulse shape. The modified shape can be temporally compressed, expanded, or structured in some complex way to suit some application. There is no requirement on the spectral bandwidth of the original laser pulse to be modified. It is also possible to produce repetitive laser pulses from a CW input laser beam.

Of particular utility is the ability to significantly compress an optical pulse in time while substantially conserving optical pulse energy to give an increase in peak pulse power which is proportional to the degree of pulse compression for an ideal lossless system. To illustrate, the simplest embodiment depicted in FIG. 4a is briefly described. An electro-optic beam deflector 10 is synchronized with a laser pulse such that deflection through the angle $\beta$ occurs while a single pulse is traversing the electro-optic deflector. A lens 42 is placed at a focal length distance from the origin of the exiting laser beam from electro-optic deflector 10 in order to convert an angular scan to a linear scan, and to allow the optical beam to enter an optical step prism 44 normally. Thus, the temporal pulse is spatially spread out over the base of step prism 44, which is shown enlarged in FIG. 4b. The front portion of the pulse must travel a greater optical path length through step prism 44 to a target on image plane 47 than the back portion of the pulse for a scan direction from top to bottom as shown in FIG. 4a. By choosing the depth and refractive index of step prism 44 to give an optical delay from top to bottom that is nearly the same as the temporal width of the laser pulse, the back portion of the laser pulse catches-up to the front portion of the pulse after traversing step prism 44. A lens 46 then focuses the compressed pulse to a target on image plane 47.

Since the step width of step prism 44 is typically much larger than the wavelength of the laser (a typical step width might be as large as the incident laser beam spot diameter), step prism 44 is not spectrally dispersive like a grating and the optical power throughput using standard anti-reflection optical coatings would be high. Thus, for the system of FIG. 4a the energy of the laser pulse that has been focused at image plane 47 would be conserved with respect to the original laser pulse, giving a compressed laser pulse with a multiplicative increase in peak laser power approximately proportional to the factor of temporal pulse compression (some losses due to diffraction at the step edges will occur). The added advantage of such a scheme for pulse compression is that the peak power density is kept relatively low until focusing lens 46 recombines the temporally delayed pulse segments to some desired target. Thus, the requirement for high power optics is minimized.

The same basic concept can be realized in a number of other embodiments. For example, a mirror array 26 consisting generally of a system of mirror segments is used as shown in FIG. 2 to temporally segment a laser pulse in a manner analogous to the previously described embodiment. The laser pulse is electro-optically scanned across mirror array 26, where each mirror segment reflects different temporal portions of a laser pulse through different optical path lengths onto a lens 28 that focuses the light onto a target which in this case is shown to be a detector 22. The spacing, width, and orientation of the mirrors can be varied as required to affect a desired modification of laser pulse shape.

In yet another embodiment, a light pipe 58 depicted in FIG. 6 is used to achieve pulse shaping. The time required for a laser pulse to travel from the input of light pipe 58 to its output depends on the inclination angle $\theta-\phi$. Since the steeper optical rays with larger angles $\theta-\phi$ will have a longer travel time to the end of light pipe 58, pulse compression is achieved by rapidly deflecting the optical pulse through an angle $\phi$ such that the front portion of the pulse experiences a steeper trajectory than the back portion of the pulse, again facilitating pulse compression in a manner consistent with the general concept of the previously described embodiments.

In all the conceived embodiments, the electro-optic deflection angle $\phi(t)$ can be modulated to give other than constant angular sweep velocities, thus providing an additional parameter for active laser pulse shaping. Furthermore, though the various embodiments of the subject invention described herein emphasize the modification of a so-called optical pulse, there is no particular constraint on the nature of the input optical power or energy to be modified. The input optical beam to be modified can be largely of constant power as a function of time, also called a continuous wave (CW) laser beam. For example, a sinusoidal electro-optic deflection induced by a sinusoidal electro-optic driving voltage would, in the embodiment of FIG. 2, produce a series of pulses at detector 22. Generally, an optical deflection from the bottom to the top of mirror array 26 in FIG. 2 would compress a temporal "length" of laser beam 17, while a deflection in the opposite direction would stretch a temporal length of laser beam 17. Since laser energy is largely conserved, the temporally compressed portion of the beam is raised in absolute power, while the temporally stretched portion of the beam is lowered in absolute power. The duration, amplitude, and intensity background of the modified laser signal would depend on the exact optical geometry.

Figure 1:
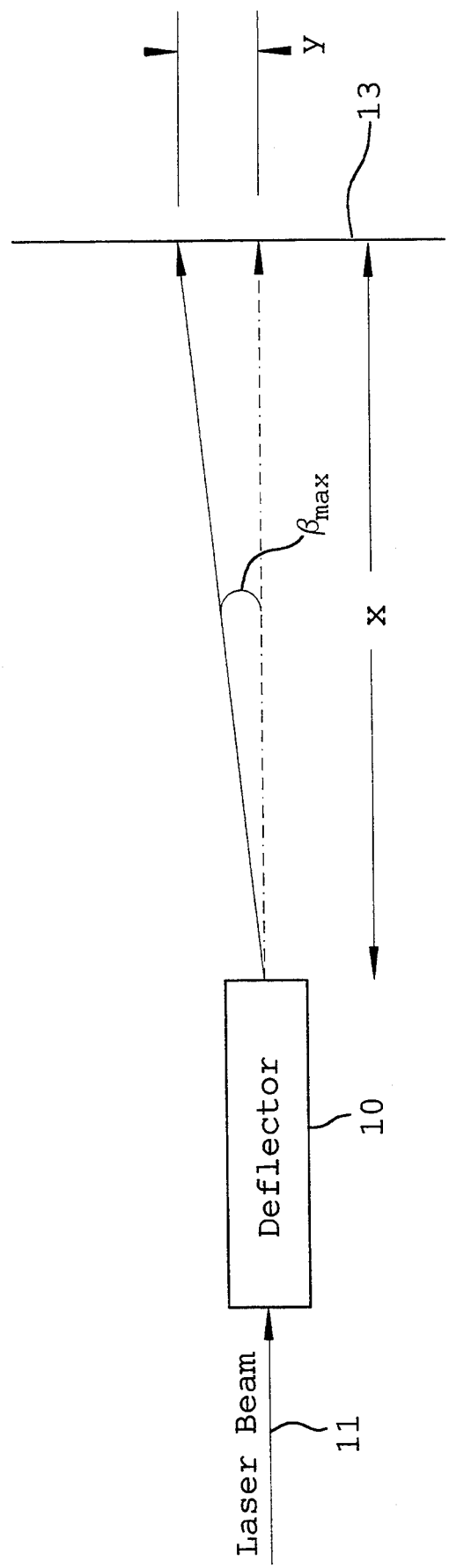
FIG. 1 shows laser beam deflection from an electro-optic deflector.

| REFERENCE NUMERALS IN DRAWINGS | |
|---|---|
| 10 Optical beam deflector | 11 Laser beam/pulse |
| 12 Voltage Generator | 13 Target/image plane |
| 14 Transmission line | 17 Laser bean/pulse |
| 16 Glass wedge | 20 Transmission line |
| 18 Optical detector | 24 Oscilloscope |
| 22 Optical detector | 26 Mirror array |
| 25 Collimating lens | 30 Collimating lens |
| 28 Focusing lens | 34 Quarter wave plate (QWP) |
| 32 Polarizing beamsplitter (PBS) | 38 Focusing lens |
| 36 Mirror array | 42 Collimating lens |
| 40 Target/image plane | 46 Focusing lens |
| 44 Step prism | 48 Fiber delay lines |
| 47 Target/image plane | 52 Input coupling lenses |
| 50 Collimating lens | 54 Focusing lens |
| 53 Output coupling lenses | 58 Light-pipe |
| 56 Target/image plane | 62 Target/image plane |
| 60 Focusing lens | 66 Light-pipe |
| 64 Reflective flaps | 70 Target/image plane |
| 68 Focusing lens | 72 Output-side reflective wall |
| 71 Input-side reflective wall | 74 Electro-optic window |
| 73 Reflective ceiling | 78 Target/image plane |
| 76 Focusing lens | 84 First spherical mirror |
| 80 Voltage source | 88 Output laser beam |
| 86 Second spherical mirror | |

DETAILED DESCRIPTION OF THE PREFERRED EMBODIMENTS

A key component of the subject invention is the device used to achieve rapid deflection of the laser beam. Of the various methods of laser beam deflection and scanning, the one which offers the greatest control and speed necessary for the invention utilizes the electro-optic effect. Using certain materials with a refractive index that varies with applied electric field, it is possible to make devices which can deflect a laser beam with a sweep speed that depends on the rise time of the electrical signal being applied to the electro-optic material. Deflection angles swept by a laser beam that has traversed the electro-optic deflector are proportional to the voltages applied to the electro-optic deflector. Thus, a modulated voltage signal driving the electro-optic deflector will similarly modulate the deflection. The company Conoptics, Inc. of Danbury, Conn. manufactures "off the shelf" electro-optic deflectors and can configure customized electro-optic deflection systems. Conoptics can produce a "traveling wave" electro-optic beam deflection system which provides sweep speeds of 6.5 milli-radians per kV of applied voltage with rise times as fast as 0.7 ns, and is the preferred electro-optic deflection device/system for the subject invention described herein. The pulsed voltage source is preferably provided by a model PBGI voltage pulser made by Kentech Instruments Ltd. of South Moreton, England, which can provide pulses of over 5 kV with rise times of 100 picoseconds (ps). Referring to FIG. 1, the magnitude and speed over which a laser beam 11 can be deflected at an image plane 13 a distance x from electro-optic deflector 10 is found from simple geometry. In FIG. 1, y is the maximum vertical deflection distance at image plane 13, $\beta_{max}$ is the corresponding maximum deflection angle, and $\tau_r$ is the time required for electro-optic deflector 10 to sweep through angle $\beta_{max}$. The magnitude of deflection in y at the image plane 13 in FIG. 1 is $y = x.\tan\beta$. The velocity of the linear scan at a distance x from electro-optic deflector 10 is thus $$v_s = (x/\tau_r).\tan\beta_{max}. \qquad (1)$$

As an example, an electro-optic deflector arrangement with a specification of 6.5 mrad/kV (Conoptics Inc. model), driven with a 5 kV peak applied voltage pulse would give a maximum deflection angle $\beta_{max}$ of 1.9 degrees. Thus, for x=1 meter, y=3.3 cm. Since the electro-optic deflector is electrically driven, the timing of the actual deflection can be precisely controlled using standard electronic techniques. The electrical driving source for the electro-optic deflector has a rise time response that is preferably faster than 1 ns and has a voltage magnitude preferably greater than a few kilovolts. Laser driven photoconductive switches may also be used as the driving voltage source for the deflector. The laser wavelength of the input beam used can in principle be anything. The desired wavelength range must be specified when ordering electro-optic deflector 10 from a manufacturer since different wavelengths require different electro-optic materials and optical coatings.

Electro-optic deflectors may also be placed in series to achieve scanning in a plane rather than a line. In such a system, one electro-optic deflector scans in the x direction while the other scans in the y direction. For simplicity, all preferred embodiments described herein use electro-optic deflection in one direction only, though this need not be the case. Clearly, deflection in two dimensions would allow the use of two dimensions in the optical system and/or element which facilitates a change in optical path length with deflection position. Additional information on electro-optic deflectors can be obtained in the article by L. Beiser, "The electro-optic (gradient) deflector," May 1991 issue of OE reports (published by The International Society for Optical Engineering) and its accompanying references. Other design variations of electro-optic deflectors and supporting optical systems which have utility for the subject invention described herein include the book "Electro-optic and acousto-optic scanning and deflection," by Milton Gottlieb et al., Marcel Dekker, Inc., New York, 1983, and the paper by J. D. Zook and T. C. Lee, "Design of Analog E-O Deflectors," Proc. SPIE 1969, 1970 p. 288.

Another method of laser deflection uses the acousto-optic effect in optical materials and is also covered in detail in the aforementioned text. Since acousto-optic deflection is also activated electrically, it can potentially replace the electro-optic deflector in the embodiments which follow; however, acousto-optic deflection is generally slow compared to electro-optic deflection and would normally not be the preferred method of deflection.

An alternate method to deflect a laser beam uses optical beam steering. By controlling phase differences between portions of the same laser beam and/or phase differences between individual lasers in an array of lasers, it is possible to steer the laser beam in the far field. An example of such phase control uses an array of optical waveguides whose relative phase relationships for a guided laser beam can be changed electro-optically or all-optically using the Kerr effect. Since both the electro-optic effect and Kerr effect are very fast phenomena, the resulting rapid beam deflection is suitable for the subject invention described herein. Examples of such devices are given in the paper by H. K. Chiang et al, "The analysis of a phased-delayed optical two-state switch," IEEE Photonics Technology Letters, vol. 4, p. 368, 1992, and in the paper by D. R. Wight et al., "Novel phased array optical device implemented using GaAs/AlGaAs technology," Appl. Physics Lett., vol. 59, p. 899, August, 1991. Since this technology is not readily available at present and is still under development, it is not considered the preferred method of beam deflection for the subject invention.

The basic physics of beam steering from a phased array is also used to direct or deflect microwave and millimeter wave electromagnetic beams or signals, and is discussed in chapter 16 of the book "Microwave Solid State Circuit Design," by I. Bahl and P. Bhartia, John Wiley & Sons, 1988, and the paper by P. Heim et al., "Frequency division multiplexed microwave and baseband digital optical fiber link for phased array antennas," IEEE Trans. Microwave Theory and Techniques, May 1990, p. 494, and the references contained therein.

Another method to deflect a laser beam uses a waveguide device structure in which prisms are formed by ferroelectric domain inversion. This device is to be described in detail at the 13th Conference on Lasers and Electro-optics (CLEO) in Baltimore, Md. in May of 1993 and is to be presented by researchers from Carnegie Mellon University.

Other methods of optical beam steering and deflection include the use of rotating polygon mirrors, vibrational mirrors, and holographic scanners, all of which are discussed in detail by L. Beiser in the "Laser Scanning Notebook" published by SPIE, 1992. Since these systems are generally slow beam deflectors, they are not preferred deflection devices.

Figure 2:
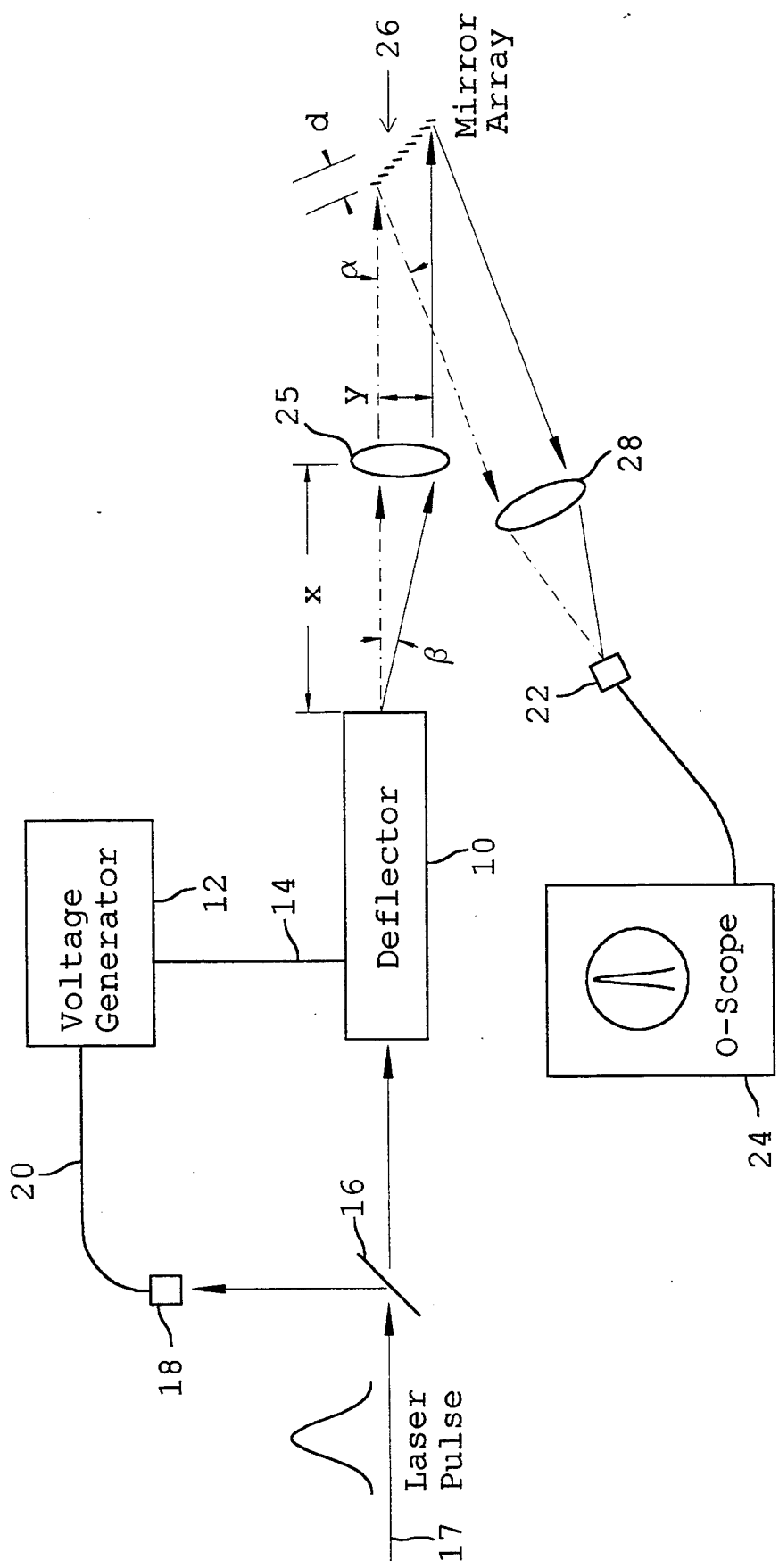
FIG. 2 shows a system for optical pulse shaping using a mirror array to provide varying optical path lengths to a target for different deflection angles.

A preferred embodiment of the invention using electro-optic beam deflection is shown in FIG. 2. A lens 25 is placed at a distance equal to its focal length from the exit port of electro-optic deflector 10 to give a paraxial linear beam scan. Deflector 10 is represented genetically, and may actually be a series of two or more mechanically or electrically coupled electro-optic deflection devices. A voltage pulse provided by a high voltage pulse generator 12 such as Kentech Instruments model PBGI is applied to electro-optic deflector 10 via a coax or electrical transmission line 14. This voltage pulse, which is preferably greater than 1 kV, activates the electro-optic beam deflection at the same time the laser pulse is traversing electro-optic deflector 10. This synchronous timing is achieved by detecting a laser pulse before it enters deflector 10 using a glass slide or wedge 16 to direct a small fraction of the optical input beam 17 to a fast photodetector 18 which converts the optical signal into an electrical signal that can trigger voltage pulse generator 12. The fast photodetector 18 includes an amplifier which converts the photodetector's electrical signal to a 5 to 10 volt signal that is output into an electrical coax or transmission line 20 that connects to the trigger input of high voltage pulse generator 12. Many lasers, especially mode-locked lasers, provide an electrical output that is synchronized with the optical pulses that it produces. Such an electrical signal can be used in place of detector/amplifier 18 for triggering. In either case, the optical pulse that is detected for the purpose of triggering electro-optic deflector 10 is preferably the same optical pulse that is to be deflected.

For the common case of a laser that produces a "train" of optical pulses separated by some constant interval of time, the detected optical pulse can be one of the optical pulses occurring earlier in time than the optical pulse to be electro-optically deflected. This allows more time, if necessary, for electrical triggering of the voltage pulse: generator 12 which drives the electro-optic deflector 10. Setting the timing of the trigger is accomplished preferably using proper electrical lengths of transmission line 14 and/or transmission line 20 to allow activation of the electro-optic deflection at the same time an optical pulse is traversing electro-optic deflector 10 and/or by using an active electrical digital delay such as model DG-535 made by Stanford Research of Palo Alto, Calif. which can delay a trigger signal in controllable 10 ps time intervals. A digital delay such as this would electrically connect between detector 18 and the input trigger of the voltage pulse generator 12. A method of monitoring whether or not the optical pulse is traversing electro-optic deflector 10 during actual deflection is to use the configuration of FIG. 2 with an optical detector 22 as shown. Detector 22 is electrically connected to a fast oscilloscope for viewing of the optical pulse. Adjustment of the electrical delays using different lengths of transmission line 14 and/or transmission line 20 or using different delay settings on a passive or active electrical delay unit will affect the detected optical signal. When a laser pulse is traversing electro-optic deflector 10 during a time when the electro-optic deflection is not occurring, the detected optical signal at detector 22 will be largely similar to the original input pulse in shape. Changing the electrical delay in one of the ways described will not change this detected pulse until the timing is such that electro-optic deflection is occurring at or near the time that the optical pulse as traversing electro-optic deflector 10. Further adjustments in the electrical delay will optimize the desired affect on the detected optical pulse. Another timing test is to simply observe the laser beam at an image plane in the far field after the electro-optic deflector and adjust the electrical timing as described until the beam spot image on the image plane becomes elongated, indicating beam deflection. This last method will work for a laser pulse train (such as from a mode-locked laser) with a pulse-to-pulse period which is greater than the transient deflection time of the electro-optic deflector.

As shown in FIG. 2, the temporal pulse is deflected over the distance y at a lens 25, illuminating a mirror array 26 comprised of reflective segments of width w. The mirror segments are preferably spaced at regular intervals, and are at small angles with respect to the incident laser beam direction. Conceptually, the deflected laser pulse is effectively segmented in time with each segment being of temporal width $\tau=w/v_s$, where w is the mirror segment width and $v_s$ is the scanned beam velocity which is assumed largely constant. A second lens 28 is placed as shown and is of sufficient width to collect all the reflected laser energy and focus it to some desired target. Mirror array 26 in FIG. 2 has a geometry that is particularly well suited for pulse compression. To achieve pulse compression, the first and last mirror of mirror array 26 will have an optical path length difference which corresponds to the temporal width of the original pulse to be compressed. Thus, for the optimal compression of a 1 ns full width half maximum (FWHM) Gaussian shaped temporal laser pulse, the distance between the first and last mirror in air would be approximately $d=c.10^{-9} s=0.3$ meters and the laser pulse would be deflected upward starting from the bottom of lens 25 as shown. Using the electro-optic deflection system described earlier, a driving voltage pulse gives a deflection of about 2 degrees in about 1 ns. The 2 degree deflection corresponds to a linear scan in FIG. 2 of y=3.3 cm for x=1 meter. Mirror array 26 would thus span a vertical distance of 3.3 cm. For a mirror segment width of 0.1 cm, there would be at 3.3/0.1=33 mirrors each tilted at a small angle as shown with the first and last mirror spaced a distance d=0.3 m apart. A lens 28 spatially recombines the delayed laser beam segments to a focus. For a laser beam with a Gaussian spatial intensity distribution with a $1/e^2$ diameter of 1 mm, the original 1 ns FWHM pulse would be compressed to approximately 60 ps with an order of magnitude increase in peak pulse power for this particular configuration. A small energy loss due to diffraction effects from the mirror segment edges will occur; however, because the size of the mirrors is much greater than the optical wavelength and because there are relatively few edges, the effect would be small.

Estimating the degree of achievable pulse compression from this scheme is done using the following concepts. For a laser beam with a spot diameter $w_o$ incident on the mirrors that is less than the mirror step widths w, each temporal segment of a laser pulse f(t) is delayed with respect to the others depending on the optical path transit time difference between mirrors. For equi-distant steps like that shown in FIG. 2, the minimum achievable temporal width of the compressed pulse is approximately equal to $\tau_{min}=(w+w_o)/v_s$, where $v_s$ is the assumed linear scan velocity of the laser beam across the mirror segments. For maximum flexibility in laser pulse compression and general pulse shaping, it is desirable to keep w and $w_o$ as small as possible and $v_s$ as large as possible in order to break the input laser pulse f(t) into as many temporal segments as possible. The limit to this, however, is that as the mirror segments become especially numerous, there will be increased optical energy losses due to cumulative diffraction from the mirror segment edges.

In order to get the incident laser beam diameter $w_o$ smaller to facilitate narrower temporal segmentation of the laser pulse f(t), lens 25 is placed farther than a focal length away from electro-optic deflector 10. In this configuration, the center of the mirror array is placed at approximately the nominal focus of the laser beam coming from lens 10, which is scanned across the mirror array in the usual way. A limiting factor of this configuration is that the laser beam spot diameter incident on each mirror will not be constant, since each minor segment is at a different distance from lens 25. In order to overcome this limitation, a gradient index lens could be custom designed through a company like Melles Griot of Irvine, Calif. which would give a desired focal length dependent on the location on the lens that the laser beam passes through. For example, the gradient index lens would replace lens 25 in FIG. 2 and would be designed such that it focuses largely to the same spot diameter at each mirror segment. Alternately, lens 25 could be replaced by an array of lenses, each with a focal length providing similar spot diameters at each mirror segment for a particular mirror array geometry. Using such a configuration, the pulse compression factor given in the previous example would be substantially increased. Using 10 times the number of mirror segments in the previous example each of which is 1/10th the original width, there would be 333 minor segments of 100 μm width. For a gradient index lens that gives less than a 100 μm spot diameter on each mirror "step" or segment, this new configuration would provide 10 times the pulse compression as before, giving a 160 fold decrease in the laser pulse's original 1 ns temporal width and a concomitant increase in peak pulse power. For many such mirror steps it is clearly more practical to have the mirror steps manufactured into one unit. For example, a glass step prism can be made and coated for optical reflection at the desired wavelength, again using custom optical manufacture.

In the examples given, the mirror segments were spaced regularly and had the same width w. In applications where precise shaping of the temporal laser pulse is important, such as isotope separation by photoexcitation or other physical process applications, the mirror spacing can be non-regular and the mirror width can vary over the mirror array. Thus, the laser pulse can be split up into various temporal width segments each of which is delayed with respect to the other by an amount that depends the mirror's physical placement with respect to the other mirrors. In this manner, each laser pulse segment can be "placed" in time relative to the other laser pulse segments as desired at some image plane or target, thus facilitating the synthesis of some desired laser pulse shape. Also, each mirror segment could be turned at a slightly different angle in order to deflect the beam at some desired location on an image plane. A useful example of this would be for each mirror segment to deflect the scanned beam to the exact same spot on some image plane in order to achieve focus without the lens 28 in FIG. 2. Though the examples and FIG. 2 show air surrounding the mirror array, it could be immersed in any optical medium. Also, the electrical driving signal to the electro-optic deflector 10 can be modulated to deflect the laser pulse in a generally non-constant manner to give additional control on pulse shaping. Finally, to mitigate any interference effects that might occur in the general system of FIG. 2, a Cornu or other light depolarizer can be used at any point after electro-optic deflector 10. Cornu depolarizers are available from Melles Griot of Irvine, Calif.

Figure 3:
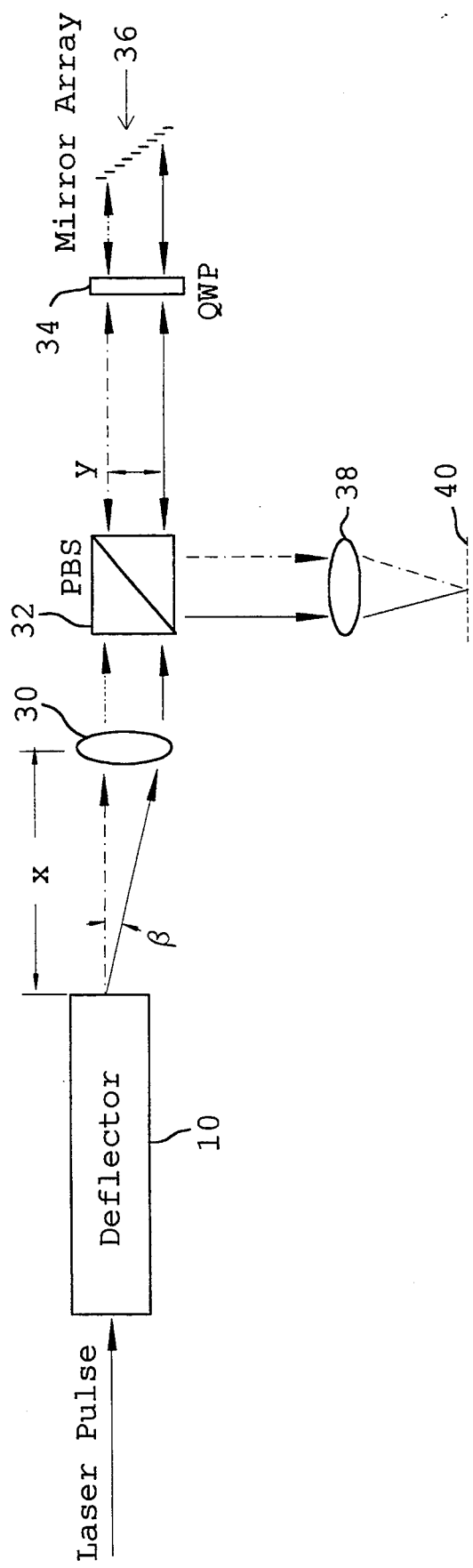
FIG. 3 shows a system for optical pulse shaping using a mirror array which is illuminated normally.

An alternate embodiment is shown in FIG. 3 that uses polarizing optical elements to keep the incident laser beam normal at all times to the step mirrors. Electro-optic deflector 10 electrically driven as described previously deflects a laser pulse across a lens 30 which enters a polarizing beamsplitter (PBS) 32 which is oriented to pass the input laser beam. The input laser beam is vertically polarized so as to be largely reflected through a quarter wave plate (QWP) 34, rotated with its axis 45 degrees from the vertical, and is reflected off the individual mirrors segments of mirror array 36, each of which could be any width or spacing to its nearest neighbor, and could be continuously movable in the direction normal to its surface. The back reflected laser beam from mirror array 36 gets rotated orthogonal to its original polarization orientation upon the second pass through the QWP, and passes largely through PBS 32 onto a lens 38 which focuses the temporally modified pulse onto a desired target on image plane 40. The medium surrounding the mirrors could be air, liquid, glass, or any optical material. Calculating the optical delay between mirrors in this case would simply involve the effects of the refractive index. A Faraday rotator could also be used in place of QWP 34.

Figure 4A:
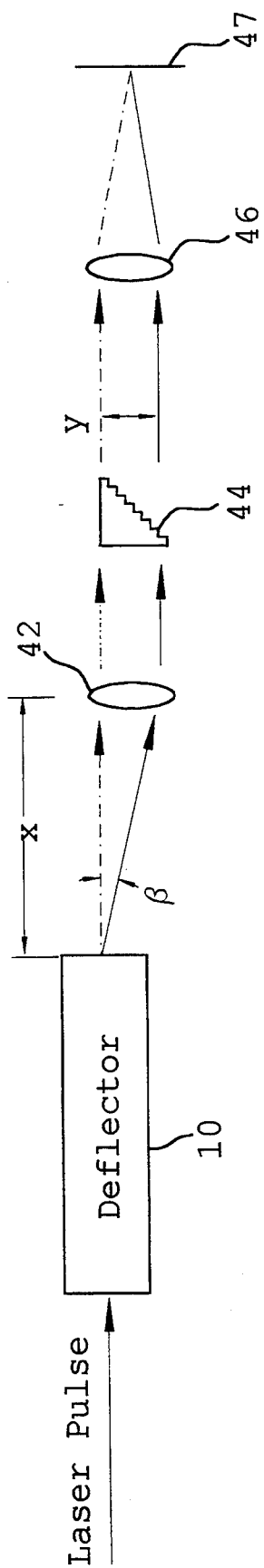
FIG. 4a shows a system for optical pulse shaping using a step prism to provide varying optical path lengths to a target for different deflection angles.
Figure 4B:
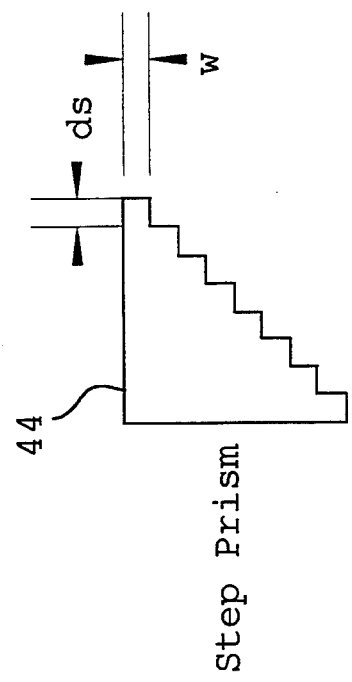
FIG. 4b shows an enlarged view of the step prism.

A completely analogous embodiment using an optical glass step prism 44 as the delaying medium is shown in FIG. 4a. Again, a lens 42 transfers the electro-optically generated angular scan from deflector 10 into a linear scan which, when combined with step prism 44, effectively segments different temporal portions of the laser pulse that are recombined by a lens 46 which focuses the modified laser energy onto a desired target on image plane 47. The step prism avoids the problem of total internal reflection associated with a normal prism, thus more easily allowing variable or stepped optical delays. The configuration of FIG. 4a is suited for laser pulse compression, as the front portion of the pulse is delayed with respect to the back portion for a deflected laser pulse illumination moving from top to bottom on step prism 44. Again, the estimated limit in temporal width of the compressed pulse is $t_{min}=(w+w_0)/v_s$, where w is the step width, $w_0$ is the beam diameter incident on the prism steps, and $v_s$ is the scan velocity of the beam across the prism. For optimal compression, the same considerations are used as described for the embodiment of FIG. 2. The optical transit time delay from the top to the bottom of the step prism is chosen to be equal to the temporal width $\tau_w$ of the original laser pulse. For a glass refractive index of n and a step prism with m steps of height ds as shown in FIG. 4b, the total optical transit time delay is $\tau_w=(n.ds.m)/c$, where c is the speed of light in a vacuum. The step width w is chosen to be about the same size as the incident laser beam diameter $w_0$. As discussed previously for the embodiments shown generally in FIGS. 2 & 3, lens 42 can be moved out from electro-optic deflector 10 in FIG. 4 in order to get a focused beam scan on the prism steps which would allow the step width w to be decreased in size.

Step prism 44 in FIG. 4 could be of any optical material (glass, liquid, semiconductor, etc.), and need not be one unit. Each step segment of different length could be a separate rectangular or other cross section of material, each of which is coupled with adjacent such segments using epoxy, refractive index matching fluid, etc. Each such segment could further have reflective sides such that each segment will act like an optical "conduit" which prevents light from leaking out laterally as it propagates in a largely linear fashion from the incident to exit side of the step prism unit.

Figure 5:
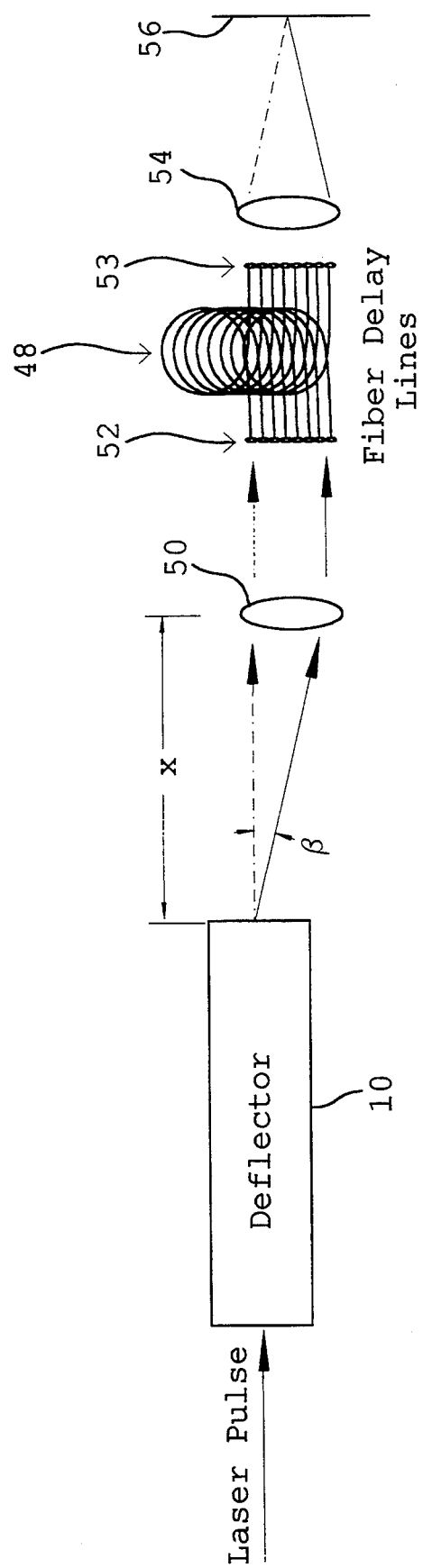
FIG. 5 shows a system for optical pulse shaping using optical fiber delay lines to provide varying optical path lengths to a target for different deflection angles.

FIG. 5 shows another embodiment which follows from the aforementioned notion of individually coupled light conduits or waveguides. An array of optical fiber delay lines 48 with generally different lengths are used in place of bulk optical "segments" in order to give optical delays. Electro-optic deflector 10 and lens 50 provide a linear scan across the identical lenses 52 which couple laser light into the fibers. A temporal segment of the laser pulse will have a temporal breadth equal to $dl/v_s$, where dl is the coupling lens 52 diameter and $v_s$ is the scan velocity. The recombining of the delayed temporal pulse segments would be a reverse of the input coupling as shown using lenses 53 to couple light out of the optical fibers and a lens 54 to focus the output light to a desired target on image plane 56. Alternately, the output side of the optical fibers could be brought together as a tight bundle with the ends aligned so that a single lens is used to out-couple the laser light from the fibers into other optics as desired. The advantage of using optical fibers as delay elements is that longer pulse widths can be accommodated without resorting to impractically large bulk segments. Again, the individual delay elements could have any desired length for general pulse shaping. Also, to avoid the problem of interference effects when recombining the light from all fibers at the output, a Lyot or other depolarizer is be used on each fiber at one or both ends if necessary. Such depolarizers are available from companies like York Ltd. The disadvantage of using optical fibers is a greater potential energy loss due to imperfect coupling of light from lenses 52 to the fibers. All lenses could be single or compound.

As an example of pulse compression using this embodiment, consider an application requiring a factor of 20 temporal pulse compression while largely maintaining the same pulse energy for a Gaussian input laser pulse of 100 ns temporal width. Each temporal segment as a result of scanning is to be 100 ns/20=5 ns wide, which, for an assumed diameter of lenses 52 of 2.5 mm, corresponds to a scan velocity of $v_s=2.5$ mm/5 ns$=5 \cdot 10^8$ m/s. As discussed previously, the scan velocity is set by equation 1. The length of the fibers is chosen such that the optical transit time through them increments by 5 ns from fiber number one to fiber number 20 for a total delay of 100 ns. If the uppermost fiber shown in FIG. 4 is the first of the fibers to be coupled into during a scan, then it is also the longest one in order that the front portion of the laser pulse is delayed with respect to the back portion of the laser pulse. For 20 2.5 mm lenses side-by-side, the necessary total scan distance at the plane of lens 50 is 5 cm, which is achieved using a maximum deflection $\beta_{max}$ of 2 degrees for a distance $x=1.5$ meters between electro-optic deflector 10 and the lens 50 as shown in FIG. 5.

Figure 6:
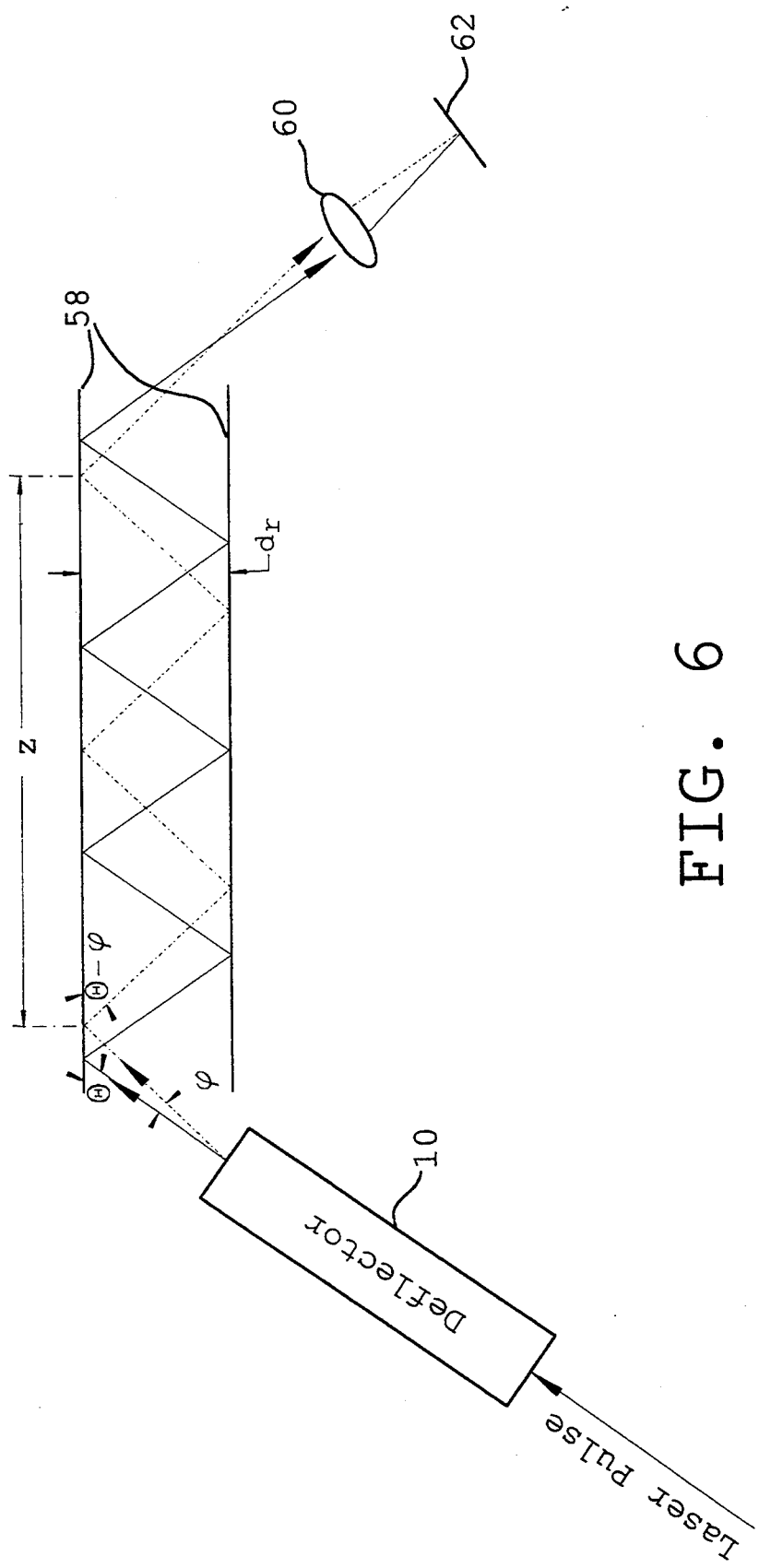
FIG. 6 shows a system for optical pulse shaping using a light-pipe to provide a variable optical path length as a function of deflection angle.

Another preferred embodiment uses a "light-pipe" 58 with electro-optic deflector 10 to give a variable optical path length as shown in FIG. 6. The same integral concept is used: a laser pulse is scanned such that different temporal portions of the pulse are delayed with respect to each other and recombined to give some desired output pulse shape. The optical delay from input to output is dependent on the inclination angle $\theta-\phi$, where $\theta$ is the nominal "rest" angle without beam deflection and $\phi$ is the electro-optical deflection angle. Any electro-optic modulation of this inclination angle during the passage of a laser pulse will therefore give a change in the pulse's temporal nature when sampled at the output of the light-pipe. The electronic triggering to synchronize the activation of the electro-optic deflection during passage of the optical pulse would be accomplished in the same manner as described earlier. In FIG. 6, the length of the bottom reflecting plane and/or the nominal inclination angle $\theta$ would be chosen to allow the electro-optically swept beam to emerge without vignetting. The advantage of this method is that the optical delay is not "stepped" as before but continuously variable. We assume for discussion that the light-pipe is two parallel, flat surfaces separated by a distance $d_r$. In practice the light pipe could be cylindrical, rectangular, or any geometry, and may have openings to conveniently allow a laser beam to be coupled in or out of the light pipe. Furthermore, the reflective inner surfaces of light pipe 58 need not be parallel.

A lens 60 is used to focus the emerging swept beam to a desired target on image plane 62. This lens can be replaced by a compound lens system which compensates for the non-paraxial nature of the emerging "rays" due to the deflection through the angle $\phi$, and would ensure that all ray directions focus largely to the same spot. A custom designed gradient index lens from an optical company like Melles Griot could also replace lens 60. In short, various common optical designs known to those skilled in the art can be used to ensure that these nearly paraxial emergent rays be focused largely to the same location on some desired image plane 62.

The optical transit time for a single optical ray from an input plane to an output plane of the light-pipe is given by $$\tau_1 = (z/c)/\cos(\theta - \phi)(t)) \quad (2)$$

where z is the length between the defined input plane and output plane as shown in FIG. 6, and c is the speed of light. The difference in optical transit time between two optical rays at different inclination angles can thus be estimated using equation 2. Since the optical beams are not being collected at exactly the axial distance z, the actual time delay may be slightly different than predicted by equation 2. The deviation from equation 2 is geometrically contained in the added path length to lens 60 after the indicated output plane that bounds the distance z. Depending on the exact configuration used, simple geometry can be used to modify equation 2 appropriately for greater accuracy. An empirical method for exact adjustment of the parameters will be given in a subsequent section.

Figure 7:
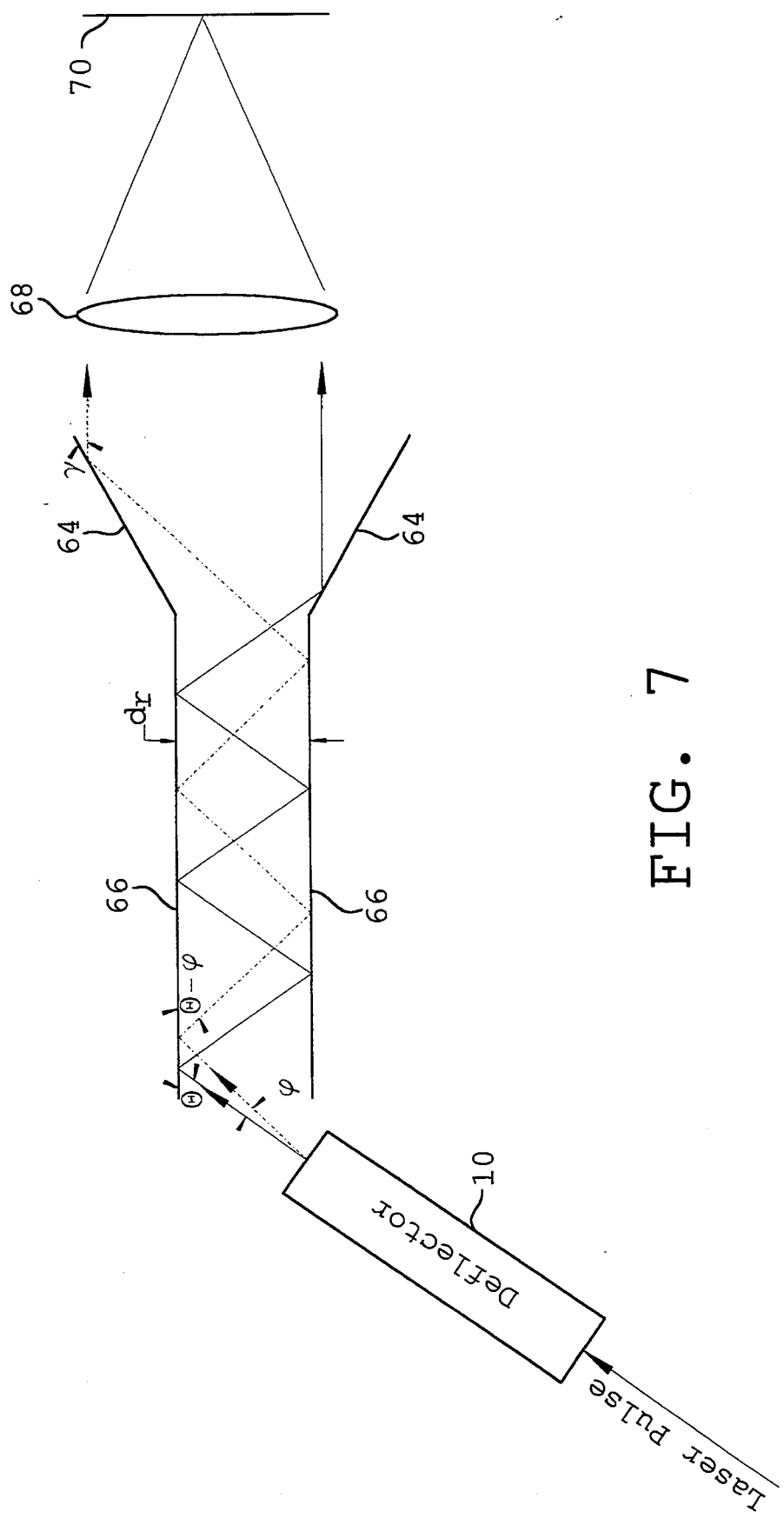
FIG. 7 shows a system for optical pulse shaping using a light-pipe with reflective flanges to direct the output light.

An alternate embodiment uses two reflective "flaps" 64 at the end of a light-pipe 66 as shown in FIG. 7 in order to give an output for $\gamma = \theta/2$ that is largely in the light-pipe's axial direction. A lens 68 would then focus the optical beam to some desired target on image plane 70. As before, the optical rays are not perfectly paraxial due to deflection through the angle $\phi$, and a standard system of lenses or a specially designed gradient index lens could replace lens 68 in order to achieve a focus at largely the same location along the light-pipe's axial direction on some desired image plane 70. Also, the angle $\gamma$ need not be $\theta/2$. The angle $\gamma$ may, for example, be smaller than $\theta/2$ in order to direct the rays inward toward a focus on a desired target. Furthermore, reflective flaps 64 may be any length or curvature to direct a beam towards a desired target. In the case of a cylindrical light-pipe, reflective flaps 64 can be a reflective cone spanning out from the end of light-pipe 66.

As an example, if laser pulse compression is desired, the general methodology would be to deflect the laser beam (during passage of the laser pulse through electro-optic deflector 10 in FIG. 6) through the angle $\phi$ such that beam deflection begins when the inclination angle gives a maximum optical transit time for the front portion of the optical pulse, and a minimum optical transit time for the back portion of the pulse. To meet this requirement, the difference in optical transit time would, as usual, be about the same as the temporal width of the original pulse. The general approach to achieve this follows. Using the known maximum deflection angle $\phi_{max}$ of the used electro-optic deflector 10, choose z and $\theta$ to give a transit time difference between $\phi = 0$ and $\phi = \phi_{max}$ that is the same as the temporal width of the optical pulse to be compressed with the aid of equation 2. Using the general configurations of FIG. 6 or 7, an optical detector is placed after the focusing lens (lens 60 in FIG. 6 or lens 68 in FIG. 7) and connected to a fast oscilloscope. Assuming the electronic synchronization has been completed as discussed earlier to give a deflected optical pulse, the angle $\theta$ is changed slightly by rotating electro-optic deflector 10 and/or light-pipe 58 (light-pipe 66 in FIG. 7) until the pulse width as seen on the oscilloscope has been minimized. This adjustment fine tunes the optical transit time difference between the different ray paths to optimize temporal compression.

A design used for the temporal compression of a Gaussian shaped optical pulse with a temporal full width half maximum (FWHM) duration of 0.2 ns follows. Using the configuration of FIG. 6, a largely linear electro-optic deflection of 1.5 degrees occurs in 0.7 ns during passage of the 0.2 ns wide Gaussian pulse as provided by the electro-optic system described earlier. Setting 0 to 60 degrees and z to 1.9 meters and using the technique described in the preceding paragraph produces an optical pulse that is compressed by a factor of about 150 times to less than 1.4 ps with an increase in peak pulse power that is about 150 times the original peak pulse power. The number of internal reflections depends on the internal diameter of the light-pipe $d_r$ and is about 16 for this case with $d_r = 20$ cm.

Though a rigorous mathematical treatment of the previous two embodiments is not necessary for actual design or use, a summary is given for additional elucidation and will be applicable with slight modification to the other covered embodiments.

A laser pulse f(t) is assumed to be temporally segmented into "ns" incremental portions. Each portion is delayed with respect to the other portions for eventual recombining. The method to accomplish this preferably uses electro-optic deflection, where the electrically driven deflection angle is assumed to be the function $\phi(t)$. The segmentation is modeled as n samples of duration ts of the laser pulse f(t). This sampling "window" that is multiplied by f(t) over the time ts is modeled as a function that is unity from time t1 to t2, where $t2 - t1 = ts$, and is zero otherwise. Mathematically this window is represented by rect(t,t1,t2). In the case of the light-pipe configuration, $\phi(t)$ translates into an optical transit time delay from input to output of $\tau_1(t)$ as given by equation 2. Thus, the resultant sum of the temporally segmented portions of the optical pulse f(t) depends on this changing transit time delay $\tau_1(t)$. The optical pulse temporal FWHM is defined to be tp, the number of portions that the optical pulse is segmented into is ns, and the temporal length of each segment is defined conveniently to be $ti = 4.tp/ns$. To simplify the model for numerical calculation, the optical transit time is modified to be discrete, that is, $\tau_1(t) = \tau_1'(ns.ti)$. With these definitions, the modified output optical pulse g(t) for the light-pipe embodiment when electro-optically deflected during the passage of an input optical pulse f(t) is approximated by $$g(t) = \sum_n h(t - \tau'_1(n) - \tau_2, n) \qquad (3)$$

where h(t,n)=f(t-2.tp).rect[t,(ns-n).ts,(ns-n+1).ts], and $\tau_2$ is a constant delay that allows proper temporal overlap between the "rect(t,t1,t2)" function and the function f(t), and is $\tau_2=\tau_1'(0)$. Since the change in optical transit time as a function of $\phi(t)$ is continuous, equation 3 is best solved using a large integer value of n, say, 1000, in order to approximate the continuous nature of the physical phenomena being modeled. An example of a "ramp" electro-optic deflection of 2 degrees per nanosecond (ns) would be modeled as simply $\phi(t)=2.t$, where t is in ns. The function f(t) might, for example, be a Gaussian or hyperbolic secant shape.

For the other embodiments depicted in FIGS. 2-5 where the optical delay is truly discrete in nature, the mathematical modeling to predict the effect on the optical pulse shape is similar. The optical transit time term $\tau_1(t)$ in equation 3 would again represent the optical transit time delay as a function of time, and would have a functionality dependent on the geometry of the optics facilitating the varying optical delay and the deflection function $\phi(t)$. To model the step like jumps in optical delay afforded by the embodiments shown in FIGS. 2-5, the time step ts in the equation for h(t,n) for regularly spaced minor or prism steps would be about equal to the width of the step w divided by the linear beam scan velocity $v_s$ across that step. The beam spot size $w_o$ can be taken into account generally by integrating the contribution of differential segments of the spatial beam intensity profile over the general relationship of equation 3.

Figure 8:
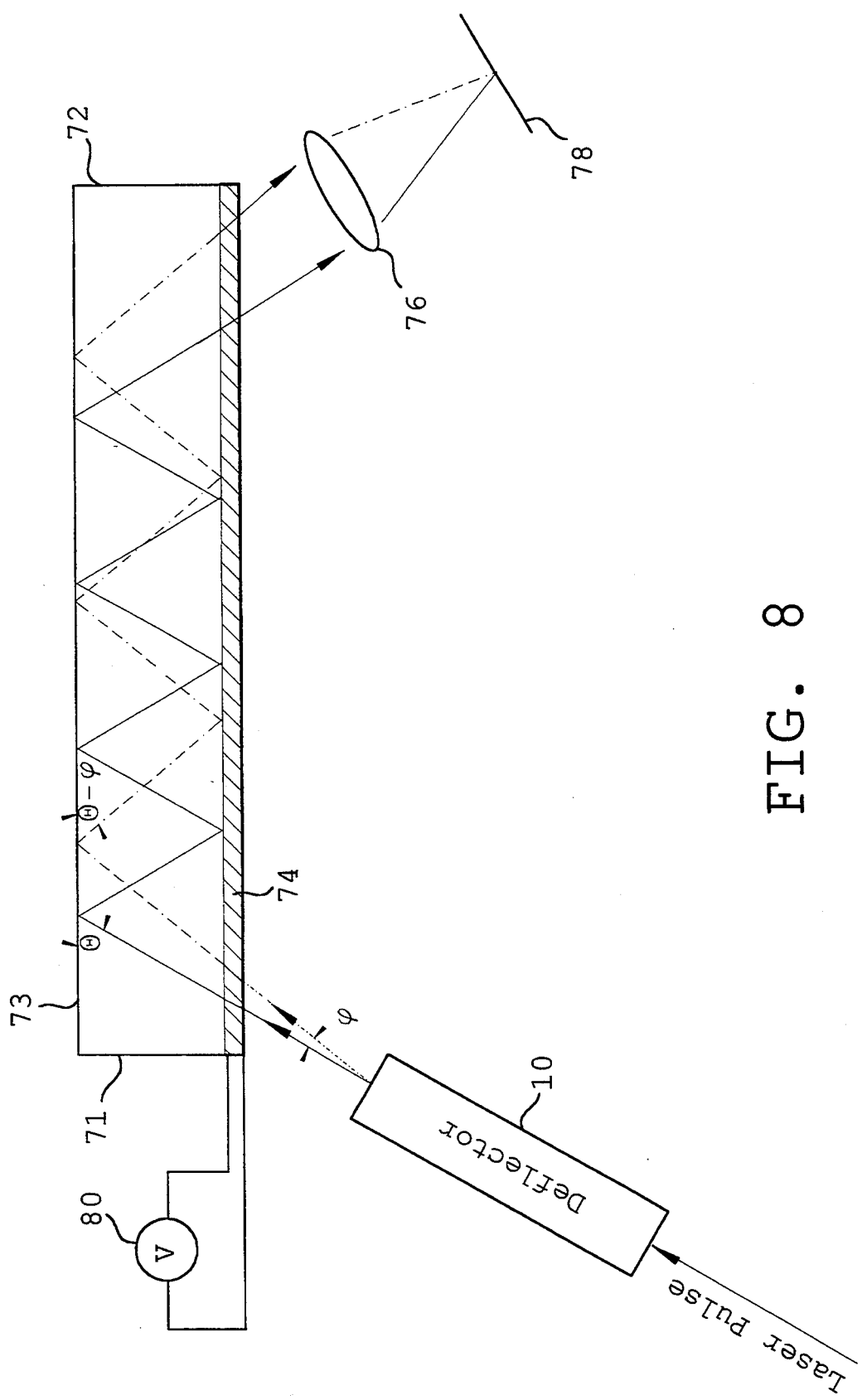
FIG. 8 shows a system for optical pulse shaping using a light-pipe with a Q-switched output capability.

In another embodiment shown in FIG. 8, the light-pipe is modified to act like an optical cavity such that the total optical path length is chosen by opening or "Q-switching" the cavity to output the laser beam at a desired time. The laser pulse output of electro-optic deflector 10 is directed through an "electro-optic window" 74 which can be rapidly activated with an applied voltage 80 to be either transmissive or reflective. Such an electro-optic device is described in U.S. Pat. No. 4,786,128 to Birnbach (issued Nov. 22, 1988). The cavity of the light-pipe is bounded by a reflective inner wall 71 at the input end, a reflective inner wall 72 at the output end, a reflective upper "ceiling" 73, and electro-optic window 74. A laser pulse is deflected in the usual way into the cavity during a time when window 74 is transmissive, and undergoes multiple reflections while window 74 is activated to be reflective until it is activated again to be transmissive. The deflected output light is collected by a lens 76 and focused onto some desired target at image plane 78. Activation of window 74 in such a manner requires synchronization of the output laser pulse from deflector 10 with voltage source 80, and is accomplished using standard techniques of the sort described earlier. The entry point of the laser pulse from electro-optic deflector 10 can also be an open aperture on window 74.

Figure 9:
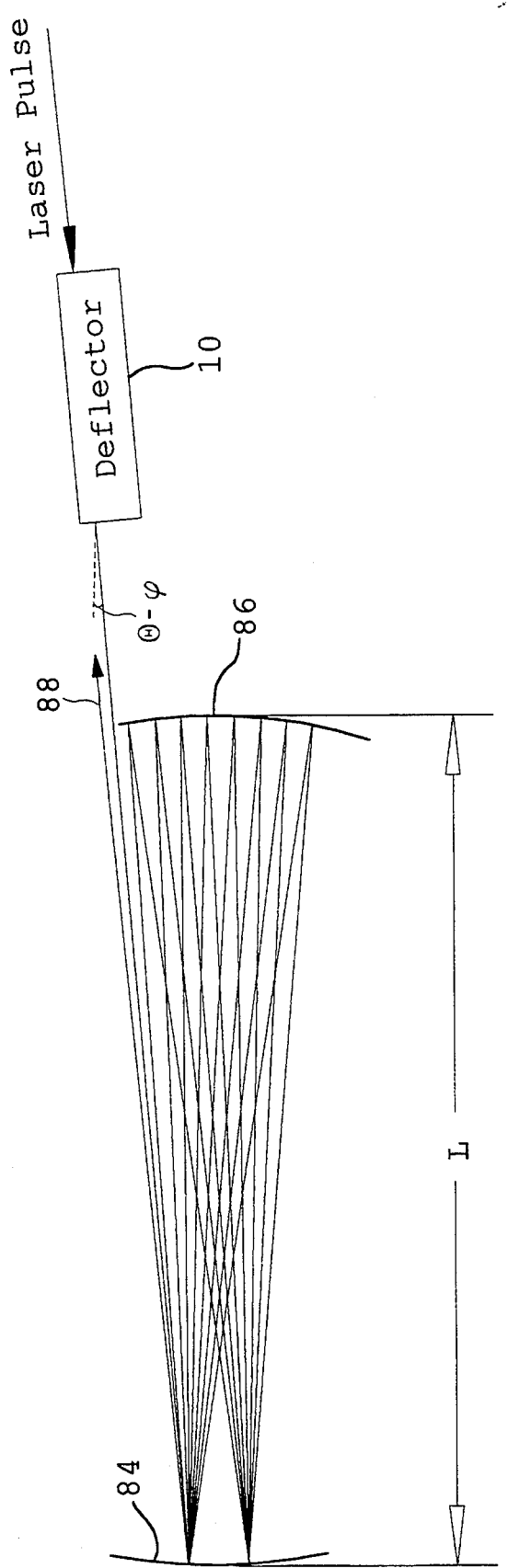
FIG. 9 shows a system for optical pulse shaping using a modified light-pipe geometry with spherical reflective sides.

In another embodiment, light-pipe 58 of FIG. 6 is modified to have reflecting inner "walls" that are curved as shown in FIG. 9, offering greater physical compactness for some pulse shaping applications than the embodiment depicted in FIGS. 6 or 7. In this arrangement, the system generally acts like a cavity or resonator where an electromagnetic signal or beam is coupled into the cavity from deflector 10. The time required before the electromagnetic signal exits the cavity depends on the deflection angle of the beam coming from deflector 10. Thus, the transit time from input to output depends on the angle $\theta-\phi$. In FIG. 9, a laser beam from deflector 10 illuminates a spherical mirror 84 which reflects the beam to a second spherical mirror 86 that has been tipped through a small angle to allow the exit of an output beam 88 after a number of internal reflections. The number of internal reflections is dependent on the inclination angle $\theta-\phi$, the mirror radii, and the distance between mirror vertices L. The ray tracings of FIG. 9 are shown for a mirror 84 radius of 100 cm, and a mirror 86 radius of 130 cm. A laser pulse that is rapidly deflected through different inclination angles by the methods previously described will have different temporal portions of itself exiting the general system of FIG. 9 at different times, thus facilitating optical pulse shaping. The mirror shape, radii, and spacing may be changed as necessary to achieve different pulse shaping effects. These effects can be monitored with an optical detector and oscilloscope as described earlier. Additional information helpful for the design of such general systems that includes an analysis of optical transit times can be obtained in a paper by L. Beiser, "Near-confocal optical scan amplifier," J. Appl. Physics, Vol. 43, No. 8, August, 1972, p. 3507.

While preferred embodiments of the invention have been described in detail along with various alternative configurations, it must be kept in mind that other modifications may also be made according to the teachings of this invention. For example, though the embodiments of the subject invention described herein emphasizes the modification of a so called optical pulse, there are no particular constraints on the nature of the input optical power or energy to be modified. For example, as mentioned previously, the input beam entering the optical deflector in any of the embodiments can be a CW laser beam. Also, the optical deflection could be in a plane rather than a line to allow general delay optical elements such as the mirror array 26 in FIG. 2 to provide different optical path length to an image plane (in this case detector 22 in FIG. 2) that is a function of two dimensions. In FIG. 2, the two dimensions would be y and the direction normal to the plane of the page. Furthermore, the optical systems supporting the light deflector can be modified in ways well known to those skilled in the art to suit specific applications, including for example, the placement of part or all of the various embodiments of the invention described herein in a laser cavity. Therefore, the disclosure of the preferred embodiments of the present invention is intended to be illustrative but not limiting of the scope of the invention which is set forth in the following claims.

I claim:

1. A system for modifying light signals comprising:
    a source providing an input light signal of predetermined spectral bandwidth;
    a means for temporally segmenting and recombining said input light signal;
    said means for temporally segmenting and recombining further comprising:
    time delay means for providing predetermined time delays which differ as a function of either the locus or the angular orientation of a directed light signal with respect to an input of said time delay means;
    light directing means for actively redirecting said light signal and for changing either the locus or the angular orientation of said light signal with respect to an input of said time delay means;

said light directing means and said time delay means being operatively disposed such that said input light signal is incrementally or differentially segmented into a plurality of time delayed temporal portions, and means for recombining said temporal portions to produce an output light signal with a greater peak amplitude than said input light signal;

whereby said means for temporally segmenting and recombining operates to reshape the amplitude characteristics of said input light signal as a function of time by at least partially overlapping said temporal portions with respect to time, and further whereby said output light signal has a spectral bandwidth which is substantially unconstrained by the predetermined bandwidth of said input light signal.

2. The system of claim 1 wherein said light directing means uses an electro-optic deflector.

3. The system of claim 1 wherein said light directing means uses an acousto-optic deflector.

4. The system of claim 1 wherein said means for recombining uses at least one optical element after said time delay means.

5. The system of claim 1 further including at least one optical element between said light directing means and said time delay means which substantially collimates said light signal.

6. The system of claim 1 wherein said time delay means uses a reflective mirror array comprised of reflective segments each of predetermined width, spacing, angle orientation, and distance from said light directing means.

7. The system of claim 1 wherein said time delay means uses a step prism each step of which has a predetermined width, depth, and effective refractive index.

8. The system of claim 1 wherein said time delay means comprises:

an array of fiber-optic delay lines of predetermined number and individual length;

said fiber-optic delay lines being optically coupled to said light signal.

9. The system of claim 1 wherein:

said time delay means comprises a light-pipe of predetermined length, width, and geometric cross section;

said light-pipe has an entrance end for accepting said light signal from said light directing means over a predetermined range of angles, and wherein said light-pipe has an exit opening at an end opposite said entrance end;

whereby said light signal is substantially contained within said light-pipe from the time it enters said entrance end to the time it exits at said exit opening.

10. The system of claim 9 wherein said light-pipe further comprises reflective flaps of predetermined length, curvature, and orientation, located at said exit opening, for redirecting said light signal upon exiting said light-pipe.

11. The system of claim 1 wherein said time delay means comprises:

a light-pipe for accepting said light signal from said light directing means at a predetermined nominal angle, wherein said light-pipe has an electro-optical window portion for selectively allowing said light signal to enter and exit said light-pipe in response to an electrical control signal, and wherein said electro-optical window portion is operable between a substantially light-transmissive mode and a substantially light-reflective mode in response to said electrical control signal;

whereby the transit time of said temporal portions within said light-pipe is a function of the time at which said light signal enters said light-pipe through said electro-optical window portion, operated in the transmissive mode, the duration over which said electro-optical window portion operates in the reflective mode, and the time at which said light signal exits said light-pipe through said electro-optical window portion, operated in the transmissive mode.

12. The system of claim 1 wherein said time delay means comprises:

a light cavity or resonator for accepting said light signal from said light directing means and for containing said light signal for a time duration that is a function of said locus or said angular orientation of said light signal with respect to an input of said cavity or resonator.

* * * * *